United States Patent [19]

Hegi et al.

[11] Patent Number: 4,950,971
[45] Date of Patent: Aug. 21, 1990

[54] DEVICE FOR POWERING ELECTRICAL LOADS, PARTICULARLY ON BICYCLES

[75] Inventors: Robert Hegi, Boppelsen; Ernst Fluckiger, Wangen, both of Switzerland

[73] Assignee: Enform Ag, Switzerland

[21] Appl. No.: 221,677

[22] Filed: Jul. 20, 1988

Related U.S. Application Data

[63] Continuation-in-part of Ser. No. 852,546, Apr. 16, 1986, abandoned.

[51] Int. Cl.⁵ .............................................. H02K 5/00
[52] U.S. Cl. ...................................... 322/1; 310/75 C
[58] Field of Search ........................ 322/1; 310/75 C; 320/62

[56] References Cited

U.S. PATENT DOCUMENTS

| | | | |
|---|---|---|---|
| 2,299,762 | 10/1942 | McDermott | 322/1 X |
| 2,488,021 | 11/1949 | May | 320/62 X |
| 4,555,656 | 11/1985 | Ryan | 322/1 X |

FOREIGN PATENT DOCUMENTS

| | | | |
|---|---|---|---|
| 2627796 | 1/1978 | Fed. Rep. of Germany | 310/75 C |
| 805712 | 12/1958 | United Kingdom | 310/75 C |

OTHER PUBLICATIONS

"Schottky Diodes Rectify Efficiently in a Bicycle--Lighting System", Looney, Jr., Electronic Design Magazine, 7/5/1977, p. 92.

Primary Examiner—R. J. Hickey
Attorney, Agent, or Firm—Wolf, Greenfield & Sacks

[57] ABSTRACT

A device for powering a number of different electrical loads, especially on bicycles with or without auxiliary motors. The device includes a generator, a drive means for the generator (on a bicycle to cooperate with a wheel of the bicycle), transmission gear means connected in advance of the generator, an accumulator, and switching means for switching between powering of the loads by the generator and accumulator and for constant charging of the accumulator by the generator. The generator, transmission gear means, accumulator and switching means are arranged in a common closed housing. The transmission gear means is connected to the drive means by a flexible shaft. An adaptor is provided by which the rotary motion of a wheel is taken up and transferred by the flexible shaft to the transmission gear means.

19 Claims, 5 Drawing Sheets

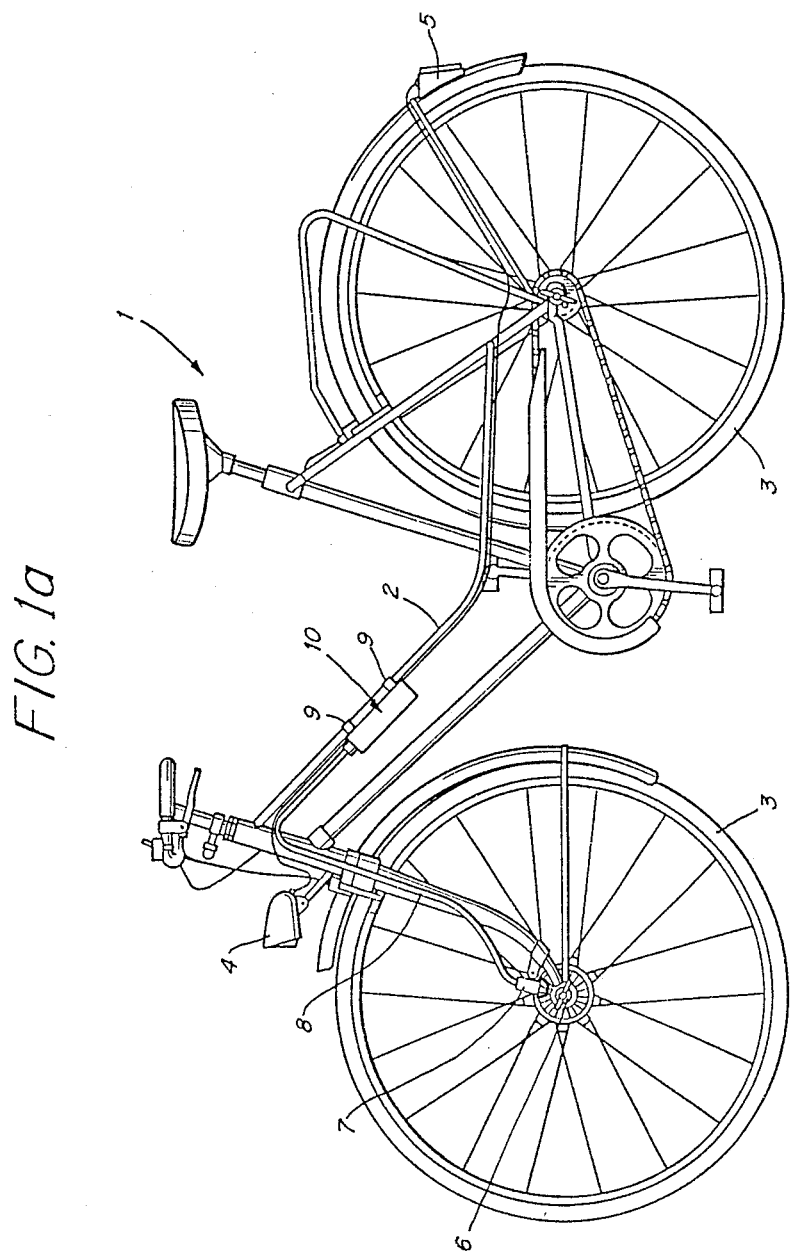

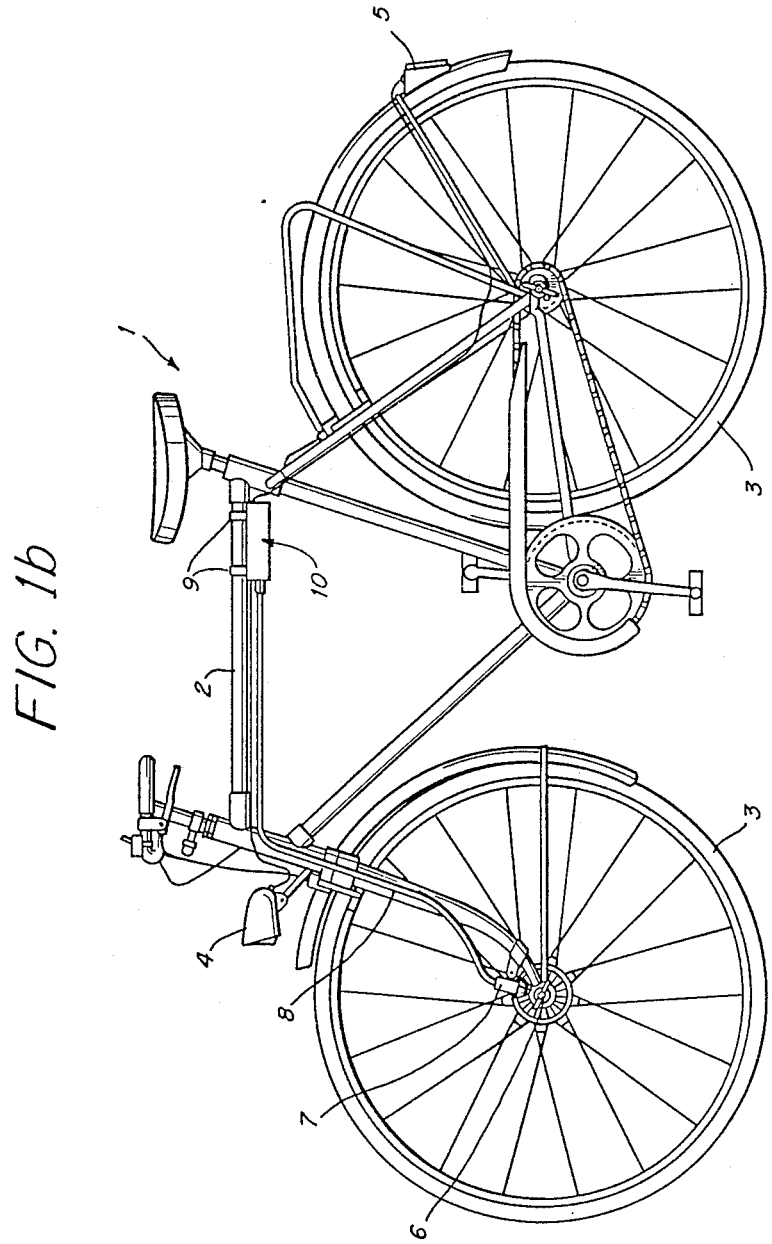

DEVICE FOR POWERING ELECTRICAL LOADS, PARTICULARLY ON BICYCLES

RELATED APPLICATION

This application is a continuation-in-part of U.S. patent application Ser. No. 06/852,546 filed Apr. 16, 1986 now abandoned.

FIELD OF THE INVENTION

This invention relates to a device for the powering of electrical loads, particularly on bicycles with or without auxiliary motors. The device comprises a generator, drive means for the generator, which in the case of a bicycle cooperates with a wheel of the bicycle, accumulator means and switching means for the operation of the generator and/or accumulator means.

DESCRIPTION OF THE PRIOR ART

Devices for powering electrical loads on bicycles, particularly for bicycle lighting, are known in very many different forms. The classical form of bicycle lighting used in olden days consisted of a dynamo driven from the front wheel of the bicycle by means of its driving pinion. Appropriate electrical leads to the front light and to the rear light represent the electrical connections. With the dynamo switched on, and while the bicycle is moving, current is produced, so that the front light and rear light can be adequately powered. However, at very low speeds, the power produced by the dynamo falls away very sharply, so that then the illumination on the bicycle becomes inadequate. When the bicycle is stationary there is of course generally no lighting at all. Therefore, at very low speeds, or when the bicycle is brought to a halt, the cyclist is in very considerable danger if it is dark, because it is then very difficult or impossible for him to be seen.

A bicycle lighting system is also known in which, in addition to the dynamo which is driven from the front wheel, the bicycle is also fitted with rechargable batteries (nickel-cadmium accumulators), such as the Colani-electronic parking light-battery system manufactured by UNION of Fröndenberg. Before the first use of the parking light the batteries of this known system must be charged up. If, after switching on, the bicycle is not used or the lighting machine is switched off again, there is only adequate current from the batteries for the front light and for the tail lights for one hour. After this the batteries have to be charged up again. When the bicycle is being used, an electronic circuit controls the supply of current to the front light and to the tail lights from the dynamo or from the batteries in dependence upon the speed of travel. At a speed above 8 km/h the batteries are switched off and only the dynamo serves as a source of current for the lighting. At speeds in excess of 15 km/h, the dynamo produces more power than is necessary for powering the front light and the tail lights, so that then the batteries are recharged. The batteries or accumulators used in this known lighting system must as a consequence be charged at least once at the beginning by a conventional universal charging device, for a charging time which can amount to about 15 hours. For cyclists who use their bicycles relatively infrequently and then only at relatively low speeds, and if also they have to come to a standstill quite often, then the accumulators will very often be fully discharged, so that a relatively frequent recharging of the batteries will be necessary.

SUMMARY OF THE INVENTION

It is an object of the present invention to provide a device for powering electrical loads, particularly on bicycles with or without auxiliary motors, which enables permanent recharging of the accumulator means to take place when the bicycle is moving, and which, additionally, has a compact construction.

This object is achieved in accordance with the present invention by a device for powering electrical loads, especially on bicycles with or without auxiliary motors, comprisinq a generator, drive means for the generator, accumulator means, and switching means for the operation of the qenrator and accumulator means, in which the generator, the accumulator means and the associated switching means are arranged in a common closed housing, in which transmission gear means are provided in the said housing connected in advance of the generator, and in which the transmission gear means are connected to said drive means by a flexible shaft.

Accordingly, the generator (dynamo), accumulator means (batteries) and associated switching means are arranged in a common closed housing. The transmission gear means is connected in advance of the generator in the same housing. Also, the transmission gear means is connected to the drive means by way of a flexible shaft. In this way one achieves a very compact construction for the bicycle lighting. All the components, except for the drive means (pinion and drive wheel on the front axle) are arranged in a closed housing so that a single unit is created which can be mounted very simply on the bicycle. The flexible shaft connecting the drive means and transmission gear means together permits a problem-free transmission of movement and an optimum arrangement of the drive means.

The provision of transmission (change-speed) gearing makes it possible to achieve the aforementioned power values, stepped to the different km/h speeds. A permanent charging of the accumulator means is therefore ensured. The very considerable advantage is achieved that even at very slow speeds the accumulator means are constantly being recharged, so that even very slow cyclists will always have charged accumulators and therefore will always have adequate parking illumination on their bicycles. The safety of the cyclist in traffic is therefore considerably increased by a bicycle illumination system in accordance with the present invention.

According to a preferred embodiment of the invention, the flexible shaft of the system is connected to the gear means by a coupling. It can be advantageous if this coupling is a threaded joint, whereby the assembly of the lighting system of the present invention is considerably simplified. Also, with this arrangement, in the case of damage for example, the flexible shaft can very easily and quickly be detached from the compact unit and a new one can be fitted.

It is also advantageous, according to a preferred feature of the invention, if the drive means comprises a gearwheel drive or friction wheel drive arranged at the center of the front wheel. Such a drive system is relatively robust and is also arranged at a position of the wheel which is least affected by dirt from the road. In this way the drive means on the one hand is protected, and on the other hand the bicycle tires which are subject to relatively greater wear are very considerably saved from wear by the elimination of additional loading resulting from drive pinions rubbing against the tires.

An advantage of the gearwheel and/or friction wheel drive lies in the fact that if at least one detent is provided on the wheel, then a simple securement of the wheel against rotation is achieved. By making the detent or detents of wedge-shaped form it is possible to achieve a simple fastening of the drive wheel between the spokes. For the maximum possible load-bearing capacity of the driving wheel, the total number of detents should correspond to the number of cross-over points formed by the wheel spokes on one side of a wheel. The use of transparent plastics material for the driving wheel gives a good optical impression overall. The use of plastics material has the advantage that the parts can be manufactured easily and that the effects of wear from environmental influences are reduced. With the drive means of the present invention one has general applicability to wheels of different diameters. The combination of a friction wheel and gearwheel guarantees an optimum force transmission under all travel conditions.

By providing several possible terminal connections for different electrical loads one increases the various possibilities for use of the device of the present invention.

An electrically controllable coupling, which separates the pinion from the driving wheel, contributes on the one hand to the convenience of the user and also to safety in traffic, since the coupling/decoupling process would happen automatically.

Having a compact arrangement of the parts in the housing, one has an arrangement which is resistant to the effects of water, heat and cold.

It is also advantageous if the housing is provided with at least one fastening clip. By means of such a fastening clip or clips the compact unit can be mounted in a simple and simultaneously secure manner on the bicycle frame. The flexible drive shaft, and also the leads to the front light and rear light, can then likewise be run along the bicycle frame in an inconspicuous and safe way.

The formation of latching recesses in the side walls of the driving wheel detents has the advantage that the detents can then be held in place by virtue of their shape, i.e., mechanical latching with the spokes, and also by means of friction.

BRIEF DESCRIPTION OF THE DRAWINGS

A number of embodiments of device in accordance with the invention will now be described by way of example and with reference to the drawings.

In the drawings:

FIGS. 1a and 1b show the provision of a device in accordance with the invention on a bicycle;

DESCRIPTION OF THE PREFERRED EMBODIMENTS

Figure 2:
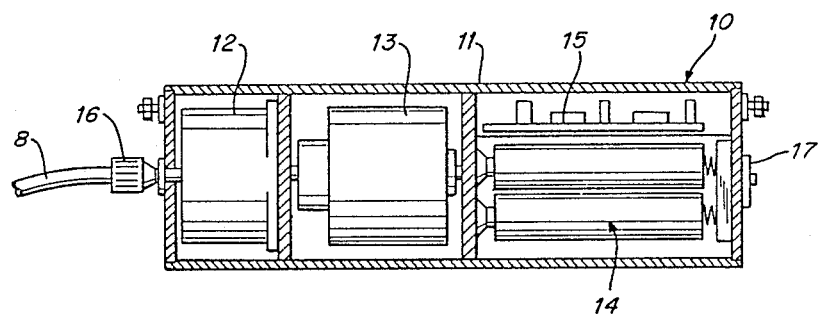
FIG. 2 is an axial sectional view of the compact unit of the device of the present invention.

As can be seen particularly well from FIGS. 1a and 1b, the device of the present invention can be fitted on a bicycle 1 which comprises a frame 2, wheels 3, a front light 4 and a rear light 5. A drive unit 7 which engages with the wheel hub 6 is provided on the front wheel 3. This drive unit 7 is connected by way of a flexible shaft 8 to a compact unit 10 which is fitted on the bicycle frame 2 by means of fastening clips 9. In the case of a bicycle 1 which is designed as a man's bicycle, the compact unit 10 can be mounted essentially below the saddle on the crossbar of the frame, as shown in FIG. 1b. In the case of a bicycle 1 designed as a ladies' bicycle, the unit 10 may be fitted to an inclined front reinforcing down-tube of the frame, as shown in FIG. 1a.

As can be seen most clearly from FIG. 2, the compact unit 10 essentially consists of a closed housing 11 in which a gearbox 12, a generator 13 and accumulators 14 are arranged in an axial serial array. An electronic switching circuit 15 is mounted in the housing next to the accumulators 14. The flexible shaft 8 is connected to the gearbox 12 by way of a coupling 16. Additionally, a switch 17 is provided by means of which the bicycle lighting can be totally switched on or off. The housing 11 is also provided with terminals for connection to the front light 4, to the rear light 5 and to ground.

Figure 3:
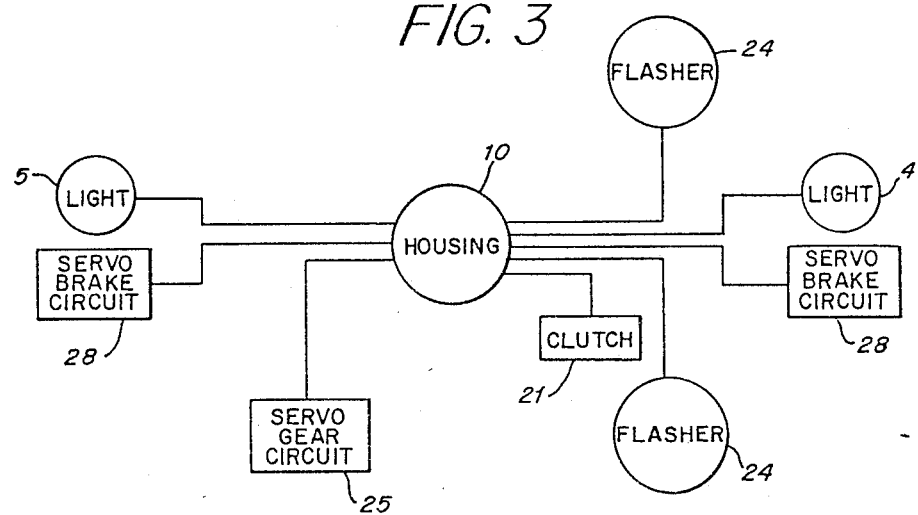
FIG. 3 is a circuit diagram which shows the possibilities of connecting up a number of electrical loads.

FIG. 3 shows a circuit diagram in which a number of electrical loads are connected to the device of the present invention. For the sake of simplicity the circuit diagram is shown as operating with a DC source, to which the following electrical loads are connected: lights 4 and 5 for front and rear; flashers 24 for left and right (these being particularly necessary for bicycles with auxiliary motors); an electrically controllable servo circuit 25 for the individual gears; an electrically controllable servo circuit 28 for servo-assisted braking; and an electrically controllable clutch 21 for coupling and decoupling the driving pinion from the driving wheel.

Figure 4:
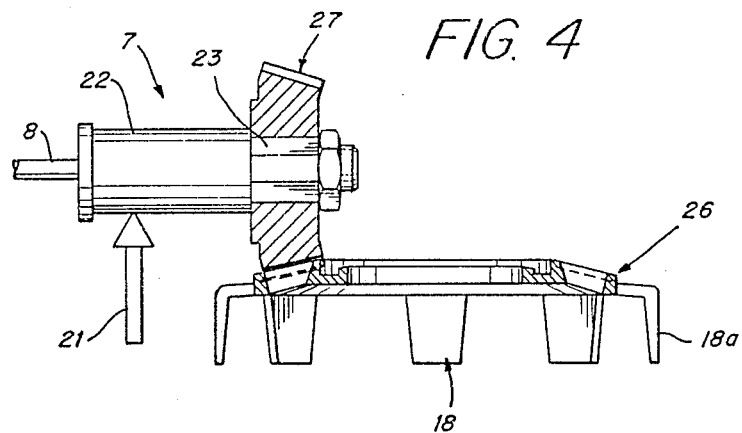
FIG. 4 is a front view of a drive unit of the device of the present invention.
Figure 5:
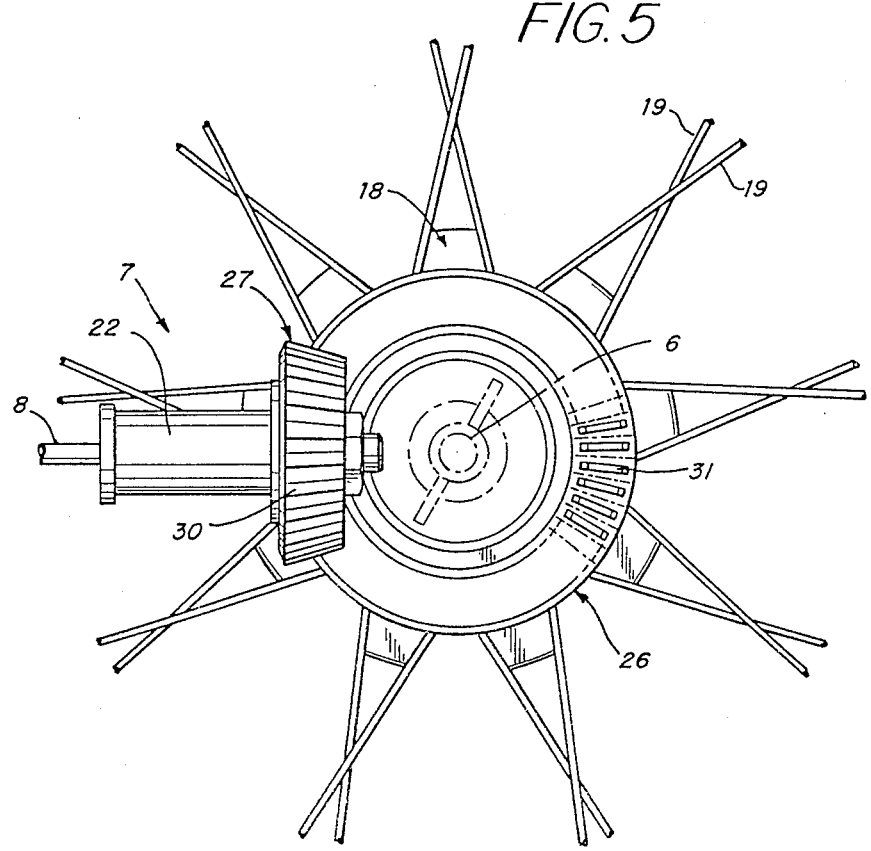
FIG. 5 is a side view of the drive unit of FIG. 4.

Figs. 4 and 5 show the drive unit 7 of the device of the present invention from the front and from the side respectively. In these Figures there is shown a driving wheel 26, which is here shown as a toothed gear wheel, and which is in engagement with a pinion 27. Around the circumference of the driving wheel 26 are formed nine detents in the form of wedge-shaped claws 18, 18a which, in this embodiment, respectively engage radially inwardly of the crossover points of each pair of spokes 19. In the fitting of the driving wheel 26 the spokes 19 are slightly deformed by the insertion of claws 18, 18a. The frictional force which arises provides an additional security against dislocation.

In one particular embodient, the driving wheel 26 has 44 teeth 31 and the pinion 27 has 11 teeth 30. The pinion 27 is secured on a shaft 22 by a hexagonal nut 23 which prevents the pinion rotating relevant to the shaft. The shaft 22 drives the resilient shaft 8. Furthermore, the shaft 22 is connected to a coupling (shown by arrow 21) which, in a particular embodiment, is electrically controllable. The coupling brings the pinion 27 in engagement with the driving wheel 26 and also separates it from the latter.

A powerful gearbox 12 is necessary in the device of the present invention since a powerful generator is used which must make available the necessary energy for the various electrical loads. In a particular embodient the operating voltage is 7.4 volts. The gearbox 12 which is used can be optimally designed in dependence upon the number of electrical loads.

The device of the present invention can also be used for bicycles with auxiliary motors, which for example have a hub space of 30 cm³.

Figure 6:
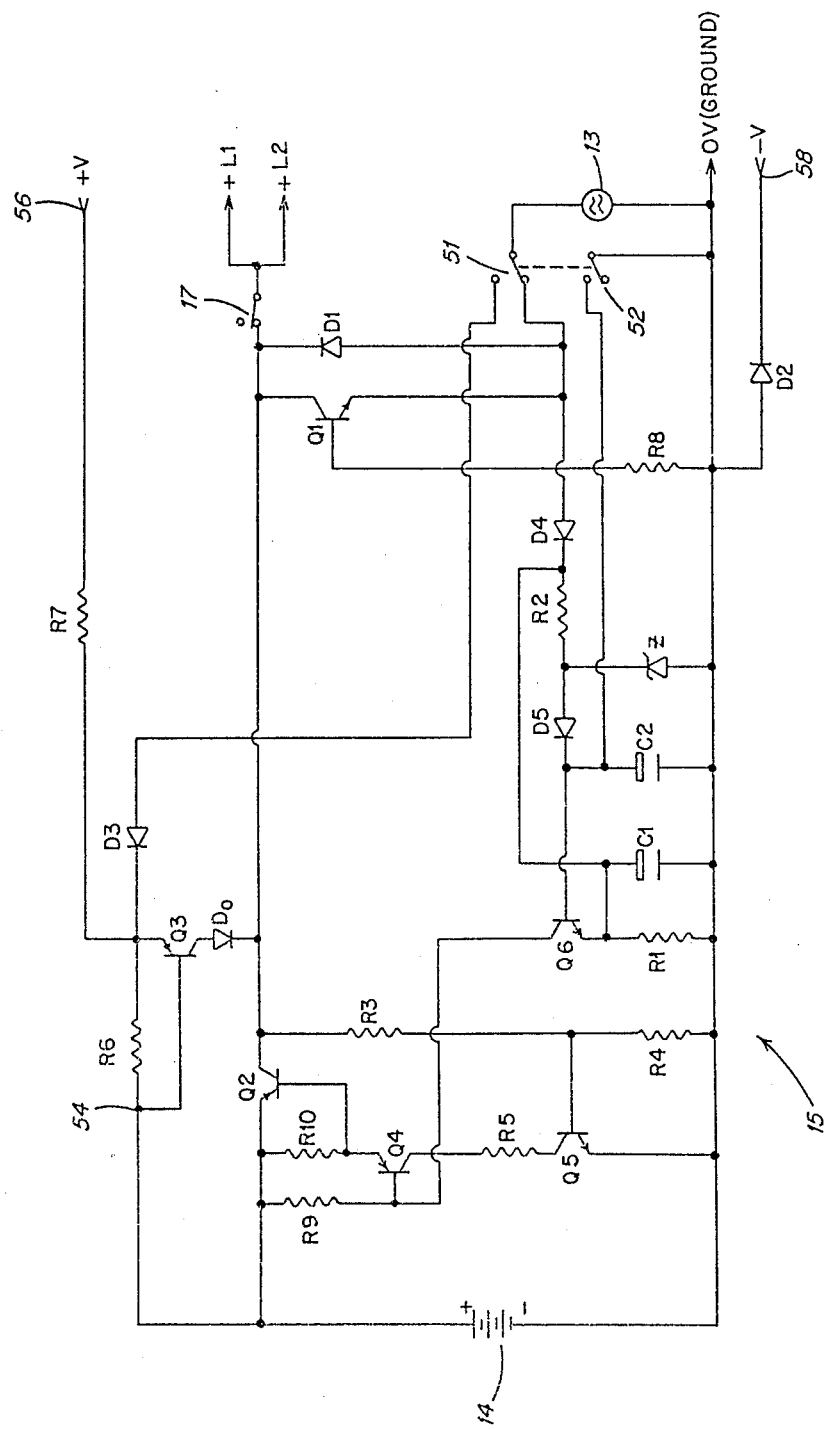
FIG. 6 is a circuit diagram which accomplishes the switching of the power supply from the generator to the accumulator and the constant charging of the accumulator by the generator.

Referring to FIG. 6, the switching of the power supply from the generator 13 to the accumulator 14 is accomplished by an electronic switch comprising transistors Q2, Q4 and Q6. FIG. 6 shows a circuit 15 in which two loads, L1 and L2, can be driven by the circuit.

There are three modes in which the circuit of FIG. 6 can operate. In the first mode, the accumulator 14 is cut off by the electronic switch (transistors Q2, Q4 and Q6) so that the loads L1 and L2 are driven solely by the generator 13. In the second mode, the accumulator 14 drives the loads L1 and L2. As will be explained in further detail, the second mode is activated when the bicycle is stationary or moving at very low speeds (e.g., approximately 3 km/h or less). The specific speed at which the second mode is activated may be selectively determined by means of the transmission gear means and its gearing ratio, the type of generator used, and on the component values of the FIG. 6 circuit. The third mode is provided when switches S1 and S2 are switched from the first position (down) in which they are shown in FIG. 6 to the second position (up). In this third mode, the generator is used to charge the accumulator and this can be carried out at any time the bicycle is used without the need to drive at speeds above 15 km/h, as the prior art device requires. Furthermore, in the third mode, under appropriate circumstances, the generator can also power the loads L1 and L2.

In the first mode, when the generator is driven at an adequately high speed (e.g., 3 km/h or greater), it creates the necessary voltage to turn off transistor Q2, thereby disconnecting the accumulator from driving the loads. When the bicycle is moving at a speed of about 3 km/h the generator 13 produces a voltage substantial enough to charge capacitors C1 and C2 via the diode circuit comprising diodes D4 and D5, or via the zener diode Z which limits the voltage across capacitor C2. This turns transistor Q6 off since resistor R2 and zener diode Z assure that capacitor C1 will be driven to a higher voltage than capacitor C2. Since the positive node of C1 is connected to the emitter of transistor Q6 and the positive node of capacitor C2 is connected to the base of Q6, the base-emitter voltage of transistor Q6 will be reverse biased thereby turning the transistor off. As shown, the collector of transistor Q6 is coupled to the base of Q4. When transistor Q6 is turned off, transistor Q4 will in turn also be turned off. As the collector of transistor Q4 is further connected to the base of transistor Q2, transistor Q2 will also be turned off when the bicycle moves at speeds greater than approximately 3 km/h. With transistor Q2 turned off, the accumulator 14 is disconnected from the load (or any other power drain).

In this first mode, the loads are driven solely by the generator 13 through the alternating voltage switch consisting of transistor Q1 and diode D1, wherein D1 is arranged parallel to but in reverse polarity to Q1. Resistor R8 enables transistor Q1 to be an effective part of the alternating voltage switch.

Resistor R1 is provided between the emitter of transistor Q6 and the circuit ground in order to rapidly discharge capacitor C1 after the stopping of the generator. Capacitor C2 is discharged via the base-emitter track of transistor Q6, which is conductive during the period of discharge of capacitor C2.

In the second mode, at speeds of less than 3 km/h, the loads are driven primarily by the accumulator 14. A minimal amount of current from the generator 13 may also drive the loads via the circuit comprising Q1 and D1, however, this current will be negligible. In this second mode, transistor Q6 is turned on due to the low generator voltage, thereby also turning on transistors Q4 and Q2. With transistor Q2 turned on, the accumulator is connected directly between ground and the loads L1 and L2, thereby supplying power to the loads. The circuit comprising transistor Q5 and resistances R3, R4 and R5 is provided to ensure that the switching transistor Q2 is turned off in the event of a short circuit between the connection points of the loads L1 or L2 and the ground. The resistors R9 and R10 (voltage divider) are used to maintain proper voltages for controlling transistors Q4 and Q2 when switching from one state to another. Thus, resistor R9 cooperates with resistor R1 to provide a partial voltage at the base of transistor Q4.

The third mode is accomplished when manual switches S1 and S2 are simultaneously switched from the position shown in FIG. 6 to the second (up) position. When in the up position, the generator 13 charges the cells of the accumulator 14 through diode D3 and resistor R6. When the accumulator cells are charged to the point where a sufficiently high voltage is produced at node 54, transistor Q3 is turned on and the power from the generator 13 is brought, via transistor Q3, to the loads L1 and L2. In this manner, excessive heating of the resistor R6 is prevented.

The circuit is further provided with connections to allow the accumulator 14 to be charged by an external charge pump. The charge pump can be connected to the circuit and therethrough to the accumulator, via terminals 56 and 58. An additional resistor R7 is provided, which is connected in series with resistor R6 when using an external charge pump, to continuously charge the accumulator 14. The resistors R6 and R7 limit the current of the charge pump so that long term or overnight charging can be accomplished without overloading the circuit. The diode D2 is provided to prevent connection of the external charge pump to the circuit with the poles reversed.

The switch 17 is used to disconnect the loads L1 and L2 from the circuit 15.

In the preferred embodiment described herein, the component values are:

| | |
|---|---|
| R1 | 1.8 KΩ |
| R2 | 220 Ω |
| R3 | 220 Ω |
| R4 | 3.9 KΩ |
| R5 | 220 Ω |
| R6 | 3.9 Ω |
| R7 | 10 Ω |
| R8 | 560 Ω |
| R9 | 3.9 KΩ |
| R10 | 220 Ω |
| C1 | 33 μf |
| C2 | 220 μf |
| Z | 5.6 volts |

In this embodiment the circuit will switch from accumulator to generator operation at about 3 km/h. The generator 13 has an operating voltage of approximately up to 6 volts. The accumulator 14 is a 5-volt, nickel-cadmium battery, of 500 milliamp hours.

Although certain preferred embodiments of this invention have hereinbefore been described, it will be appreciated that variations of this invention will be perceived by those skilled in the art, which variations are nevertheless within the scope of this invention as defined by the claims appended hereto.

What is claimed is:

1. Apparatus for powering electrical loads on a moving vehicle such as a bicycle, comprising:
    a generator;
    drive means for the generator;
    transmission gear means connected in advance of the generator;
    an accumulator; and
    switching means for switching between powering of the loads by the accumulator, powering of the loads by the generator, and charging of the accumulator by the generator,
    the transmission gear means and switching means including means which enable continuous charging of the accumulator by the generator whenever the drive means is actuated, and the switching means including means for sensing the voltage of the accumulator such that when the voltage reaches a predetermined value the power from the generator is sent to the loads.

2. The apparatus of claim 1, wherein the drive means is adapted to engage a wheel of the vehicle.

3. Apparatus for powering electrical loads on a moving vehicle such as a bicycle, comprising:
    a generator;
    drive means for the generator;
    transmission gear means connected in advance of the generator;
    an accumulator; and
    switching means for switching between powering of the loads by the accumulator, powering of the loads by the generator, and charging of the accumulator by the generator;
    the transmission gear means and switching means including means which enable continuous charging of the accumulator by the generator whenever the drive means is actuated;
    the switching means including an electronic switch for switching between a first mode in which the loads are powered by the generator at vehicle speeds above a predetermined value and a second mode wherein the loads are powered by the accumulator at vehicle speeds below the predetermined value;
    the switching means including a manual switch for activating a third mode wherein the generator charges the accumulator whenever the vehicle is moving; and
    the switching means includes means for sensing the voltage of the accumulator, wherein in the third mode when the voltage of the accumulator means reaches a predetermined value the power from the generator is sent to the loads.

4. The apparatus of claim 3, wherein the transmission gear means, generator, accumulator, and switching means are disposed within a common housing.

5. The apparatus of claim 4, wherein the transmission gear means, generator, and accumulator are disposed in serial arrangement in the housing.

6. The apparatus of claim 4, wherein the housing has a fastening clip means for mounting the housing on the vehicle.

7. The apparatus of claim 3, wherein the transmission gear means is connected to the drive means by a flexible shaft.

8. The apparatus of claim 7, in which the flexible shaft is connected to the transmission gear means by a coupling.

9. The apparatus of claim 8, wherein the coupling is a threaded joint.

10. The apparatus of claim 6, wherein the transmission gear means has a predetermined gear ratio adapted for the electric current consumption of the loads to be powered.

11. The apparatus of claim 3, wherein the drive means is adapted to engage a bicycle wheel.

12. The apparatus of claim 11, wherein the drive means comprises a gearwheel adapted to be disposed at the center of a bicycle wheel.

13. The apparatus of claim 3, wherein the drive means comprises a gearwheel and a pinion meshing therewith.

14. The apparatus of claim 13, wherein the pinion is releasably engagable with the gearwheel.

15. The apparatus of claim 3, wherein the drive means comprises a gearwheel which has a circular form and a concentric driving surface on one face thereof, a drive pinion in meshing engagement with the gearwheel driving surface, and detent means on the face of the gearwheel opposite to the one face and extending substantially perpendicular to the plane of the gearwheel.

16. The apparatus of claim 15, wherein the detent means comprises a plurality of claws equal in number to the number of cross-over points of pairs of wheel spokes on one side of a bicycle wheel.

17. The apparatus of claim 16, wherein each of the claws is wedge-shaped both in the plane of the gearwheel and also perpendicular to the plane.

18. The apparatus of claim 17, wherein each of the claws has a portion substantially perpendicular to the plane of the gearwheel which is set on a circle having a diameter such that in pushinq the claws between the respective pairs of spokes radially inwardly of the cross-over points the spokes are elastically deformed.

19. The apparatus of claim 3, wherein in the drive means comprises a friction wheel.

* * * * *

UNITED STATES PATENT AND TRADEMARK OFFICE
CERTIFICATE OF CORRECTION

PATENT NO. : 4,950,971

DATED : August 21, 1990

INVENTOR(S) : Hegi, et al.

It is certified that error appears in the above-identified patent and that said Letters Patent is hereby corrected as shown below:

On the title page Col. 1, please add the following:
Foreign Application Priority Data item (30)
April 16, 1985 Federal Republic of Germany     G8511242.9

Signed and Sealed this

Twenty-eighth Day of January, 1992

Attest:

HARRY F. MANBECK, JR.

*Attesting Officer*     *Commissioner of Patents and Trademarks*